(12) United States Patent
Russell et al.

(10) Patent No.: US 6,467,442 B2
(45) Date of Patent: Oct. 22, 2002

(54) DIRECT INJECTION VARIABLE VALVE TIMING ENGINE CONTROL SYSTEM AND METHOD

(75) Inventors: John David Russell, Farmington Hills, MI (US); Gopichandra Sumilla, Westland, MI (US); Stephen Lee Cooper, Dearborn, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/888,032

(22) Filed: Jun. 22, 2001

(65) Prior Publication Data

US 2001/0035153 A1 Nov. 1, 2001

Related U.S. Application Data

(63) Continuation of application No. 09/420,451, filed on Oct. 18, 1999.

(51) Int. Cl.[7] ............................................ F01L 1/34
(52) U.S. Cl. .................................. 123/90.15; 123/295
(58) Field of Search ........................ 123/90.15, 90.16, 123/90.17, 90.18, 295, 305, 681, 345, 346, 347, 348

(56) References Cited

U.S. PATENT DOCUMENTS

| | | |
|---|---|---|
| 3,548,798 A | 12/1970 | Fleischer et al. |
| 4,084,568 A | 4/1978 | Sato et al. |
| 4,494,506 A | 1/1985 | Hayama et al. |
| 4,592,315 A | 6/1986 | Kobayashi et al. |
| 4,651,684 A | 3/1987 | Masuda et al. |
| 4,700,684 A | 10/1987 | Pischinger et al. |
| 4,856,465 A | 8/1989 | Denz et al. |
| 5,019,989 A | 5/1991 | Ueda et al. |
| 5,022,357 A | 6/1991 | Kawamura |

(List continued on next page.)

FOREIGN PATENT DOCUMENTS

| | | |
|---|---|---|
| DE | 3916605 A | 11/1989 |
| DE | 4209684 A | 9/1993 |
| DE | 4321413 A1 | 1/1995 |
| DE | 19847851 | 4/1999 |
| EP | 0376703 A2 | 7/1990 |
| EP | 0440314 A2 | 8/1991 |
| EP | 0560476 A1 | 9/1993 |

(List continued on next page.)

*Primary Examiner*—Gene Mancene
*Assistant Examiner*—Mahmoud Gimie
(74) *Attorney, Agent, or Firm*—Daly, Crowley & Mofford LLP

(57) ABSTRACT

A method for controlling mode transitions, such as from stratified to homogeneous mode, in a direct injection engine adjusts an intake manifold outlet control device, such as a cam timing, to rapidly control cylinder fresh charge despite manifold dynamics. In addition, a coordinated change between an intake manifold inlet control device, for example a throttle, and the outlet control device is used to achieve the rapid cylinder fresh charge control. In this way, engine torque disturbances during the mode transition are eliminated, even when cylinder air/fuel ratio is changed from one cylinder event to the next.

13 Claims, 4 Drawing Sheets

U.S. PATENT DOCUMENTS

| | | | |
|---|---|---|---|
| 5,101,786 A | 4/1992 | Kamio et al. | |
| 5,115,782 A | 5/1992 | Klinke et al. | |
| 5,152,267 A | 10/1992 | Komatsu et al. | |
| 5,168,851 A | 12/1992 | Itoyama et al. | |
| 5,170,759 A | 12/1992 | Ito | |
| 5,199,403 A | 4/1993 | Akazaki et al. | |
| 5,357,932 A | 10/1994 | Clinton et al. | |
| 5,365,908 A | 11/1994 | Takii et al. | |
| 5,396,874 A | 3/1995 | Hitomi et al. | |
| 5,414,994 A | 5/1995 | Cullen et al. | |
| 5,548,995 A | 8/1996 | Clinton et al. | |
| 5,606,960 A | 3/1997 | Takahashi et al. | |
| 5,628,290 A | 5/1997 | Iida et al. | |
| 5,635,634 A * | 6/1997 | Reuschenbach et al. | 73/118.2 |
| 5,654,501 A | 8/1997 | Grizzle et al. | |
| 5,666,916 A | 9/1997 | Fugieda et al. | |
| 5,676,112 A | 10/1997 | Bauer et al. | |
| 5,690,071 A | 11/1997 | Jankovic | |
| 5,692,471 A | 12/1997 | Zhang | |
| 5,712,786 A | 1/1998 | Ueda | |
| 5,724,927 A | 3/1998 | Suzuki | |
| 5,740,045 A | 4/1998 | Livshiz et al. | |
| 5,746,176 A | 5/1998 | Damson et al. | |
| 5,758,493 A | 6/1998 | Asik | |
| 5,765,527 A | 6/1998 | Lehner et al. | |
| 5,803,043 A | 9/1998 | Bayron et al. | |
| 5,848,529 A | 12/1998 | Katoh et al. | |
| 5,857,437 A | 1/1999 | Yoshioka | |
| 5,876,256 A | 3/1999 | Takahashi | |
| 5,896,840 A | 4/1999 | Takahashi | |
| 5,913,298 A | 6/1999 | Yoshikawa | |
| 5,950,603 A | 9/1999 | Cook et al. | |
| 5,957,096 A | 9/1999 | Clarke et al. | |
| 5,964,201 A | 10/1999 | Dickers et al. | |
| 5,967,114 A * | 10/1999 | Yasuoka | 123/295 |
| 6,000,375 A * | 12/1999 | Isobe | |
| 6,006,724 A | 12/1999 | Takahashi et al. | |
| 6,006,725 A | 12/1999 | Stefanopoulou et al. | |
| 6,009,851 A | 1/2000 | Iida et al. | |
| 6,024,069 A | 2/2000 | Yoshino | |
| 6,039,026 A | 3/2000 | Shiraishi et al. | |
| 6,055,476 A | 4/2000 | Yoshino | |
| 6,058,906 A | 5/2000 | Yoshino | |
| 6,070,567 A | 6/2000 | Kakizaki et al. | |
| 6,095,117 A | 8/2000 | Minowa et al. | |
| 6,101,993 A | 8/2000 | Lewis et al. | |
| 6,148,791 A | 11/2000 | Fujieda et al. | |
| 6,170,475 B1 | 1/2001 | Lewis et al. | |
| 6,178,371 B1 | 1/2001 | Light et al. | |
| 6,182,636 B1 | 2/2001 | Russell et al. | |
| 6,196,173 B1 | 3/2001 | Takahashi et al. | |
| 2001/0013329 A1 * | 8/2001 | Matsumoto et al. | 123/295 |

FOREIGN PATENT DOCUMENTS

| | | |
|---|---|---|
| EP | 0990775 A1 | 4/2000 |
| EP | 1020625 A2 | 7/2000 |
| GB | 2315571 A | 2/1998 |
| GB | 2338085 | 12/1999 |
| JP | 59-194058 A | 11/1984 |
| JP | 60-240828 A | 11/1985 |
| JP | 62-101825 A | 5/1987 |
| JP | 63-032122 | 2/1988 |
| JP | 1-100316 | 4/1989 |
| JP | 2-176115 A | 7/1990 |
| JP | 3-009021 | 1/1991 |
| JP | 4-143410 A | 5/1992 |
| JP | 4-148023 A | 5/1992 |
| JP | 5-086913 A | 4/1993 |
| JP | 9-125994 A | 5/1997 |
| JP | 9-256880 A | 9/1997 |
| JP | 9-303165 A | 11/1997 |
| JP | 10-37772 | 2/1998 |
| JP | 10-220256 A | 8/1998 |
| JP | 10-288055 A | 10/1998 |
| JP | 10-288056 A | 10/1998 |
| JP | 11-062643 | 3/1999 |
| JP | 11-270368 A | 10/1999 |
| WO | 99/47800 A1 | 9/1999 |

* cited by examiner

DIRECT INJECTION VARIABLE VALVE TIMING ENGINE CONTROL SYSTEM AND METHOD

This application is a continuation of Application Serial No. 09/420,451, filed Oct. 18, 1999.

FIELD OF THE INVENTION

The field of the invention relates to mode transitions in a direct injection spark ignited engine.

BACKGROUND OF THE INVENTION

In direct injection spark ignition engines, there are two modes of operation that are typically used. The first mode is termed stratified mode where fuel is injected during the compression stroke of the engine. In the stratified mode of operation, the air/fuel ratio is operated lean of stoichiometry. In the second mode of operation, termed homogeneous operation, fuel is injected during the intake stroke of the engine.

During homogeneous operation, the air/fuel can operate either lean or rich of stoichiometry. However, in some circumstances, the operable stratified operation range of lean air/fuel ratios does not coincide with any operable homogeneous, lean air/fuel ratio. Therefore, when switching between these two modes of operation, air/fuel ratio from one cylinder event to the next cylinder event changes in a discontinuous way. Because of this discontinuous change in air/fuel ratio, engine torque is uncompensated, and has an abrupt change.

One method for eliminating abrupt changes in engine cylinder air/fuel ratio is to adjust ignition timing so that abrupt changes in engine torque will be avoided. Another solution is to adjust throttle position to reduce or increase fresh charge flow entering the intake manifold and therefore compensate for changes in engine torque during discontinuous cylinder air/fuel ratio changes.

The inventors herein have recognized disadvantages with the above approaches. Regarding ignition timing adjustments to avoid abrupt changes in engine torque, this method is only applicable when the magnitude of the torque change is small. In other words, the range of authority of ignition timing is limited by engine misfire and emission constraints. Therefore, the approach is not generally applicable.

Regarding throttle position adjustments to prevent abrupt changes in engine torque, controlling flow entering the manifold cannot rapidly control cylinder charge due to manifold volume. In other words, air entering the cylinder is governed by manifold dynamics and therefore there is a torque disturbance when using the throttle to compensate for discontinuous cylinder air/fuel ratio changes. For example, if the throttle is instantly closed and no air enters the manifold through the throttle, cylinder air charge does not instantly decrease to zero. The engine must pump down the air stored in the manifold, which takes a certain number of revolutions. Therefore, the cylinder air charge gradually decreases toward zero. Such a situation is always present when trying to change cylinder charge using a control device such as a throttle.

SUMMARY OF THE INVENTION

An object of the present invention is to allow air/fuel mode transitions in direct injection engines between respective air/fuel regions which do not overlap while preventing abrupt changes in engine torque.

The above object is achieved and disadvantages of prior approaches overcome by a method for controlling an engine during a cylinder air/fuel ratio change from a first cylinder air/fuel ratio to a second cylinder air/fuel ratio, the engine having an intake manifold and an outlet control device for controlling flow from the intake manifold into the cylinder. The method comprises the steps of indicating the cylinder air/fuel ratio change, and in response to said indication, changing the outlet control device.

By using an outlet control device that controls flow exiting the manifold (entering the cylinder), it is possible to rapidly change cylinder charge despite response delays of airflow inducted through the intake manifold. In other words, a rapid change in cylinder charge can be achieved, thereby allowing a rapid change in cylinder air/fuel ratio while preventing disturbances in engine torque.

An advantage of the above aspect of the invention is that unwanted torque changes can be eliminated when abruptly changing cylinder air/fuel ratio.

In another aspect of the present invention, the above object is achieved and disadvantages of prior approaches overcome by a method for controlling an engine during a cylinder air/fuel ratio change from a first cylinder air/fuel ratio to a second cylinder air/fuel ratio, the engine having an intake manifold, an inlet control device for controlling flow entering the manifold, and an outlet control device for controlling flow exiting the intake manifold. The method comprises the steps of indicating the cylinder air/fuel ratio change, and in response to said indication, changing the outlet control device and the inlet control device.

By changing both the inlet and outlet control devices, it is possible to rapidly change the cylinder air charge despite response delays of airflow inducted through the intake manifold. Since the cylinder air charge can be rapidly changed, the cylinder air/fuel ratio change can be compensated and abrupt changes in engine torque can be avoided. In other words, the present invention controls manifold inlet and outlet flows in a coordinated way to allow a rapid change in cylinder air charge regardless of manifold volume. This rapid cylinder air charge change allows the air/fuel ratio to rapidly change while preventing abrupt changes in engine torque, even during abrupt changes in cylinder air/fuel ratio.

An advantage of the above aspect of the invention is that unwanted torque changes can be eliminated when abruptly changing cylinder air/fuel ratio.

Another advantage of the above aspect of the invention is that by using both an outlet and an inlet control device, a more controlled rapid change in cylinder charge is possible.

BRIEF DESCRIPTION OF THE DRAWINGS

The object and advantages of the invention claimed herein will be more readily understood by reading an example of an embodiment in which the invention is used to advantage with reference to the following drawings wherein:

DETAILED DESCRIPTION AND BEST MODE

Figure 1:
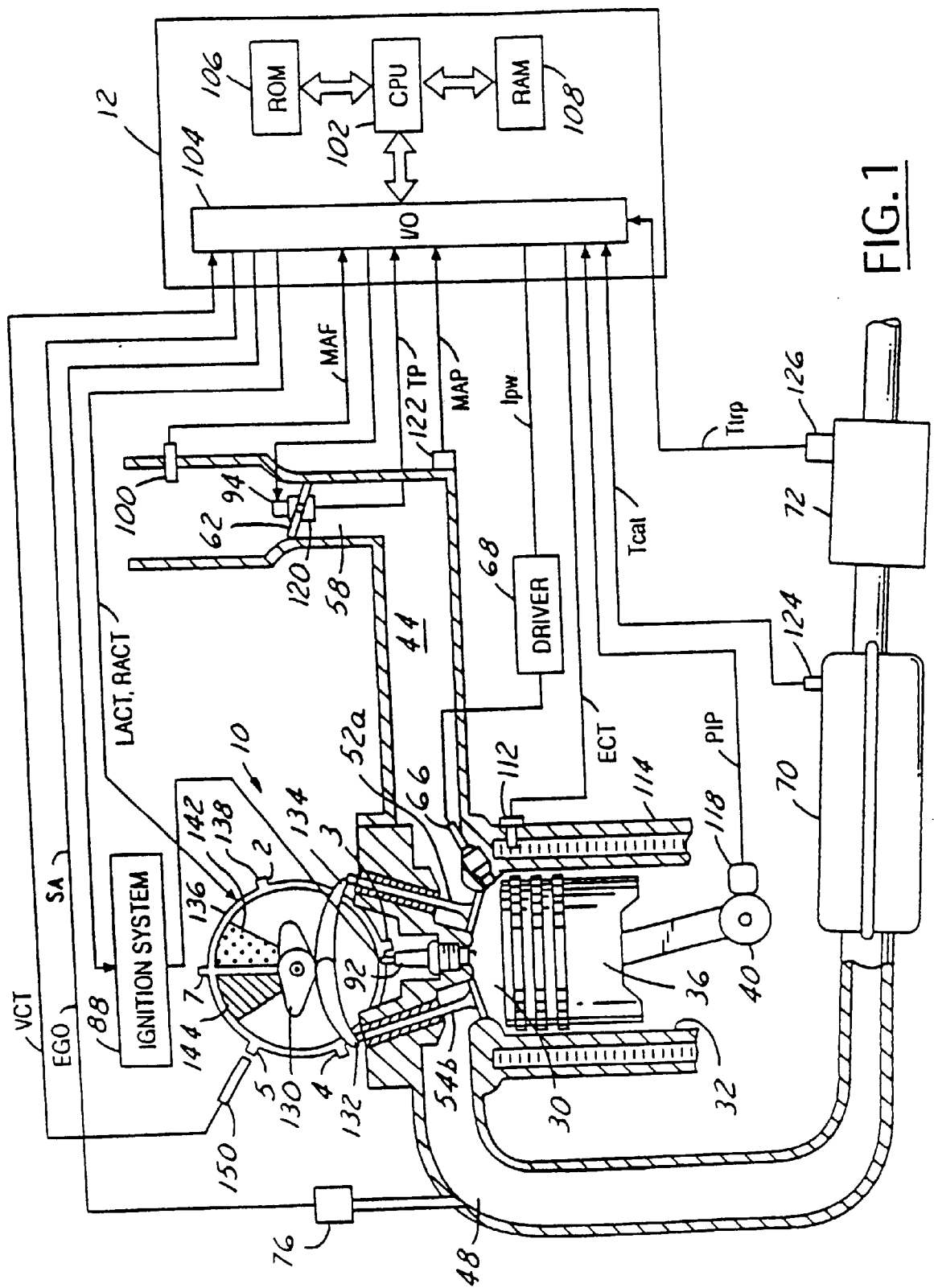
FIG. 1 is a block diagram of an embodiment in which the invention is used to advantage.

Direct injection spark ignited internal combustion engine 10, comprising a plurality of combustion chambers, is controlled by electronic engine controller 12. Combustion chamber 30 of engine 10 is shown in FIG. 1 including combustion chamber walls 32 with piston 36 positioned therein and connected to crankshaft 40. In this particular example piston 30 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of stoiehiometry and a low voltage state of signal EGOS indicates exhaust gases are lean of stoichiemetry. Signal EGOS is used to advantage during feedback air/fuel control in a conventional manner to maintain average air/fuel at stoichiometry during the steichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66 during the engine compression stroke se that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous ode, controller 12 activates fuel injector 66 during the intake stroke so that a substantially homogeneous air/fuel mixture is formed when ignition power is supplied to spark plug 92 by ignition system 88. Controller 12 controls the amount of fuel delivered by fuel injector 66 so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is also possible.

Nitrogen oxide (NOx) absorbent or trap 72 is shown positioned downstream of catalytic converter 70. NOx trap 72 absorbs NOx when engine 10 is operating lean of snoichiometry. The absorbed NOx is subsequently reacted with HC and catalyzed durinq a NOx purge cycle when controller 12 causes engine 10 to operate in either a rich homogeneous mode or a stoichiometric homogeneous mode.

Controller 12 is shown in FIG. 1 as a conventional microcomputer including: microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including: measurement of inducted mass air flow (MAP) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load. In a preferred aspect of the present invention, sensor 118, which is also used as an engine speed sensor, produces a predetermined number of equally spaced pulses every revolution of the crankshaft.

In this particular example, temperature Tcat of catalytic converter 70 and temperature Ttrp of NOx trap 72 are inferred from engine operation as disclosed in U.S. Pat. No. 5,414,994 the specification of which is incorporated herein by reference. In an alternate embodiment, temperature Tcat is provided by temperature sensor 124 and temperature Ttrp is provided by temperature sensor 126.

Continuing with FIG. 1, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another), while tooth 5 is preferably used for cylinder identification. In addition, Controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five toothed wheel, a measure of cam timing for a particular bank is received four times per revolution, with the extra signal used for cylinder identification.

Figure 2:
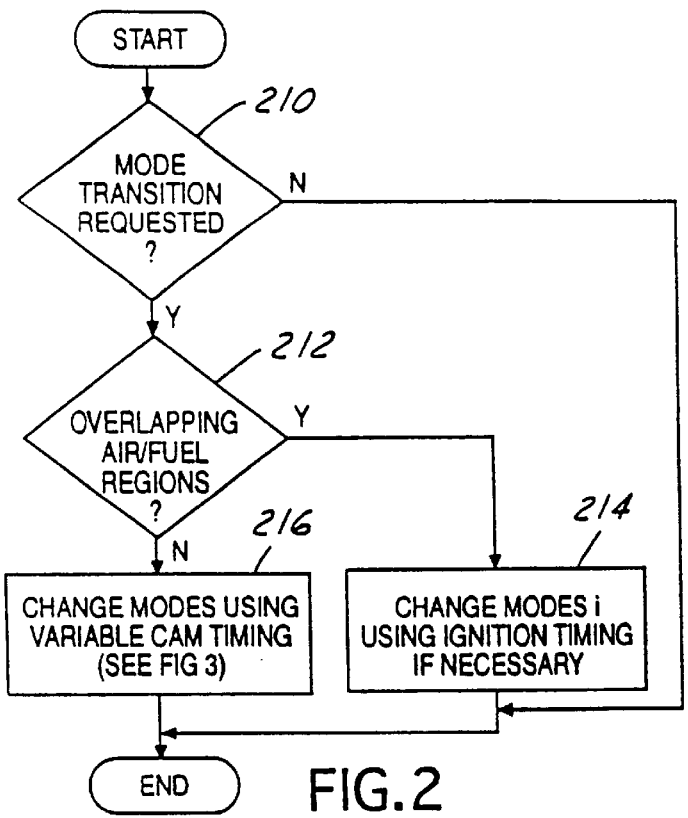
FIGS. 2, 3, 6, and 7 are high level flowcharts which perform a portion of operation of the embodiment shown in FIG. 1.

Referring now to FIG. 2, a routine is described for performing mode transitions from either stratified mode to homogeneous mode or from homogeneous mode to stratified mode. First, in step 210, a determination is made as to whether a mode transition is required. When the answer to step 210 is YES, a determination is made as to whether there is an overlapping air/fuel region based on the current engine operating conditions. The determination is made using one of the following two equations, depending upon whether the mode is being changed from stratified to homogeneous or from homogeneous to stratified.

When transitioning from stratified to homogeneous, the following condition is used:

$$\min_{spark} T^i(spark, a/f_{max}^{homogeneous}) > \max_{spark} T^i(spark, a/f_{min}^{stratifield})$$

where the equation determines if the minimum indicated engine torque ($T^i$) over available ignition timings (spark) for homogenous operation at the maximum lean homogenous air/fuel ratio ($a/f_{max}^{homogeneous}$) is greater than the maximum indicated engine torque over available ignition timings for stratified operation at the minimum lean stratified air/fuel ratio ($a/f_{max}^{homogeneous}$) at the current operating conditions defined by, for example, engine speed (RPM), fresh air flow, exhaust gas recirculation amount, and any other variables known to those skilled in the art to affect engine indicated torque. In other words, if this condition is true, then the routine continues to step 216.

When transitioning from homogeneous to stratified, the following condition is used:

$$\max_{spark} T^i(spark, a/f_{min}^{stratified}) < \min_{spark} T^i(spark, a/f_{max}^{homogeneous})$$

where the equation determines if the maximum indicated engine torque over available ignition timings for stratified operation at the minimum lean stratified air/fuel ratio ($a/f^{max,homogeneous}$) is less than the minimum indicated engine torque ($T^i$) over available ignition timings (spark) for homogenous operation at the maximum lean homogenous air/fuel ratio ($a/f_{max}^{homogeneous}$) at the current operationg conditions defined by, for example, engine speed (RPM), fresh air flow, exhaust gas recirculation amount and any other variables known to those skilled in the art to affect engine indicated torque. In other words, if this condition is true, then the routine continues to step 216.

As described above herein, these equations determine whether the mode can be changed by simply changing the injection timing, changing the injection timing and the ignition timing, or, according to the present invention using a combined strategy where the electronic throttle and variable cam timing actuators are synchronized.

Continuing with FIG. 2, when the answer to step 212 is YES, the routine continues to step 214 where the operating mode is changed by changing the injection timing or by changing the injection timing and ignition timing. When the answer to step 212 is NO, the routine continues to step 216 where the operating mode is changed by coordinated control of variable cam timing and throttle position, described later herein with particular reference to FIG. 3.

Figure 3:
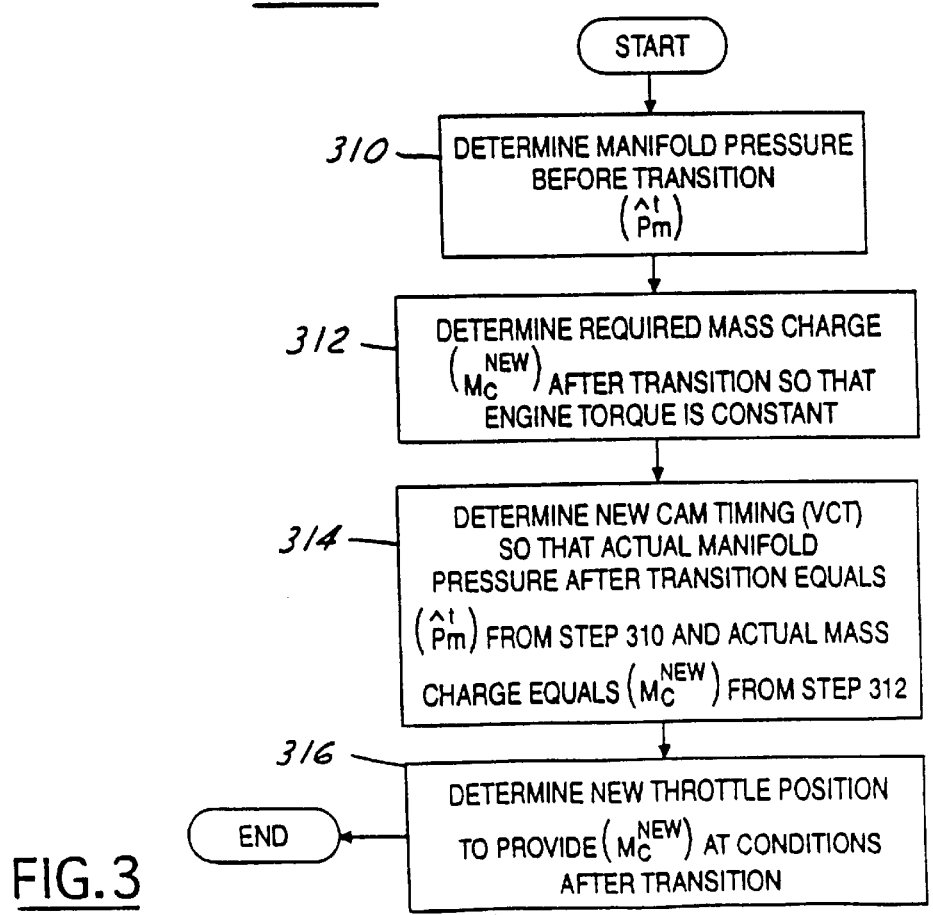

Referring now to FIG. 3, a routine for changing engine operating modes by coordinated control of variable cam timing and throttle position is described where abrupt changes in engine torque are avoided during the transition. In step 3, the current manifold pressure before the mode transition is determined using the following equation if mass charge is known:

$$\hat{p}_m^t = \alpha m_c + \beta$$

where $\hat{p}_m^t$ is the manifold pressure before the mode transition, $m_c$ is total mass charge and the parameters a,b are determine based on engine operating conditions, including current cam timing (VCT), engine speed, and manifold temperature. Also, the current indicated engine torque (Te) is estimated using current engine operating conditions. Otherwise, the current manifold pressure before the mode transition is determined by reading the manifold pressure sensor. Alternatively, various methods known to those skilled in the art for determining manifold pressure can be used.

Continuing with FIG. 3, in step 312, the new required cylinder fresh charge after the mode transition is determined so that equal engine torque is produced both before and after the mode transition. The new cylinder fresh charge $m_{c_{air}}^{new}$ value is determined according to the operating conditions after the mode using the limiting air/fuel ratio for the mode to which the engine is transitioning such that the engine torque determined in step 310 is produced. The value is determined based on characteristic engine maps represented by the function g:

$$m_c^{new} = g(T_e, a/f_{limit}, \hat{p}_m^t)$$

Other engine operating parameters such as engine speed, exhaust gas recirculation, or any other parameter affecting engine torque can be included.

Alternatively, any method known to those skilled in the art for determining the required fresh charge to produce a given amount of engine torque at a certain air/fuel ratio and manifold pressure can be used.

Continuing with FIG. 3, in step 314, the new variable cam timing angle is determined so that manifold pressure will be equal to the manifold pressure determined in step 310 and the actual mass charge will be equal to the mass charge determined in step 312 using the following equation. Here, the cam timing value which makes this equation hold represent the new desired cam timing value, $VCT^{new}$:

$$\hat{p}_m^t = \alpha m_c^{new} + \beta$$

Next, in step 316, the new throttle position is determined that will provide the new fresh charge value determined in step 312 at the manifold pressure transition value, $\hat{p}_m^t$ and current operating conditions. Any equation known to those skilled in the art to describe compressible flow through a throttle can be used to find the necessary throttle position based on the transition manifold pressure in step 314 and the new fresh charge determined in step 312.

According to the present invention, using the method described above herein, with particular reference to FIG. 3, the engine operating mode can be changed or the engine air/fuel ratio can be instantaneously jumped while avoiding abrupt changes in engine torque. By keeping manifold pressure relatively constant and simultaneously changing the throttle position and the variable cam timing position according to the equations above, cylinder charge can be rapidly changed to match the change in air/fuel ratio, thereby preventing abrupt changes in engine torque. Also, the present invention can be applied to any situation where the air/fuel ratio is abruptly changed and it is desired to prevent engine torque abrupt changes.

Further, the invention can be applied to rapidly control engine torque using airflow. In other words, engine torque control can be rapidly achieved despite manifold volume and manifold dynamics. For example, improved idle speed control can be achieved by using cam timing and electronic throttle together to rapidly control engine torque.

Figure 4:
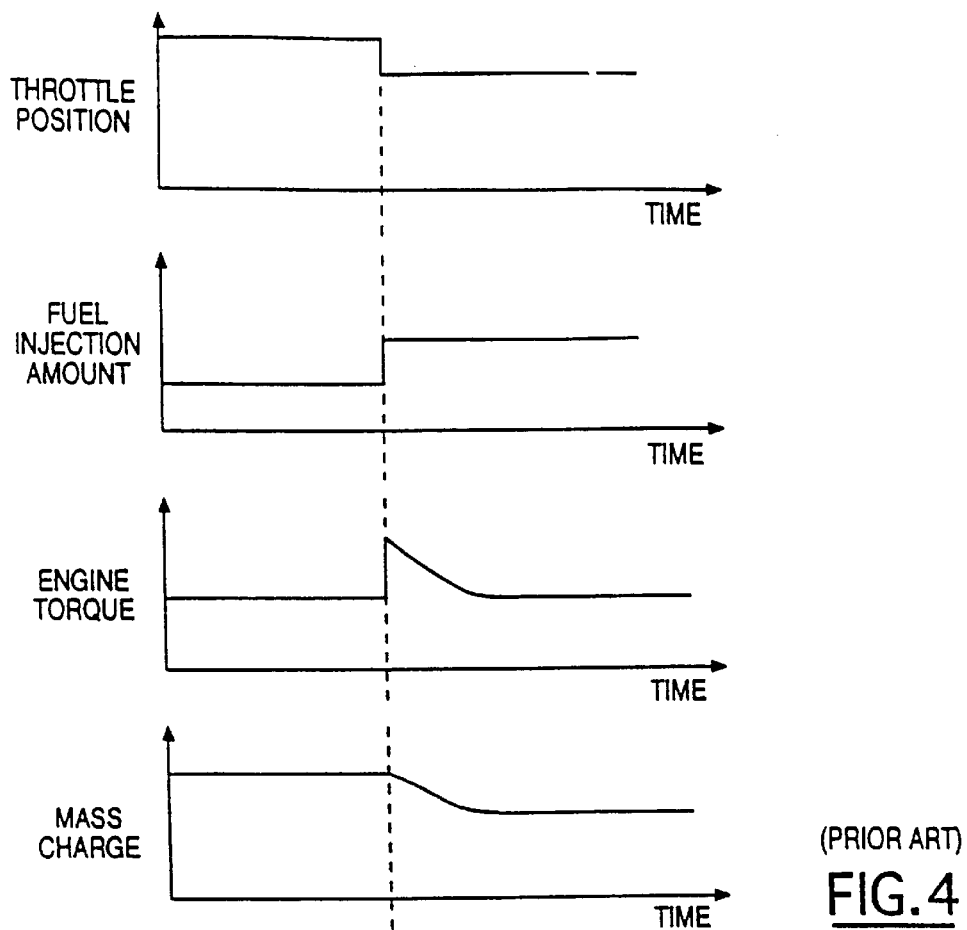
FIG. 4 is a graph depicting results using prior art approaches.

Referring now to FIG. 4, a group of plots showing operation according to prior art methods is described. In the top graph, throttle position is shown versus time. In the second graph, fuel injection amount is shown versus time. In the third graph, engine torque versus time is shown. Finally, in the fourth and bottom graph, cylinder air charge is shown versus time. At the time indicated by the vertical dashed line, a mode transition is executed where the engine transitions from operating in a stratified mode to operating in a homogeneous mode. In this situation, overlapping air/fuel ratio is not allowed so that equal torque can be produced, even using variations in ignition timing. Therefore prior art methods using airflow as a method to control torque are used. As shown in the top two graphs, the throttle position is instantaneously lowered to account for the otherwise increased torque caused by the instantaneous change in fuel injection amount to prevent degraded engine combustion. As shown in the third graph, engine torque is disturbed during the transition and does not return to the desired level until sometime after the transition, which is governed by the manifold dynamics, as shown by the fourth graph in which cylinder air charge converges to the new value.

Figure 5:
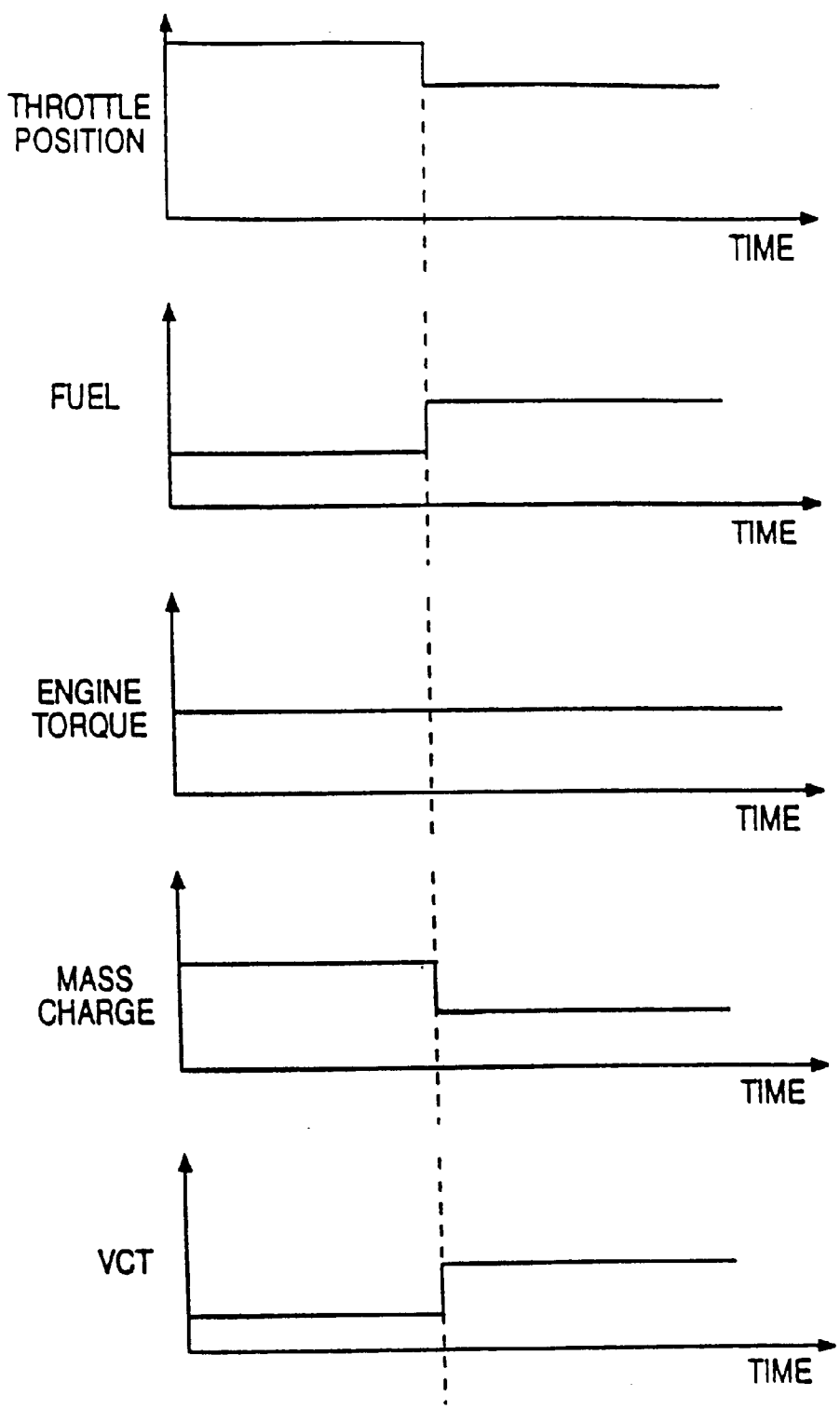
FIG. 5 is a graph depicting results using the present invention.

Referring now to FIG. 5, a mode transition from the stratified mode to the homogeneous mode is shown according to the present invention. The first graph shows throttle position versus time. The second graph shows fuel injection amount versus time. The third graph shows engine torque versus time. The fourth graph shows cylinder air charge versus time. The fifth and final graph shows variable cam timing position versus time, where the vertical axis shows increasing cam retard. At the time instant shown by the vertical dashed line, a mode transition occurs from stratified mode to homogeneous mode. According to the present invention, both the throttle position and the variable cam timing are changed in a coordinated way, such that the air charge, as shown in the fourth graph, steps down to a lower level. At the same time, the fuel injection amount is increased to avoid operating the engine in regions that would produce poor combustion. As shown in the third graph, abrupt changes in engine torque are avoided during the transition. This is due to the coordinated changed between throttle position and cam timing, where the amount of change of cam timing and throttle position is determined according to the present invention.

Figure 6:
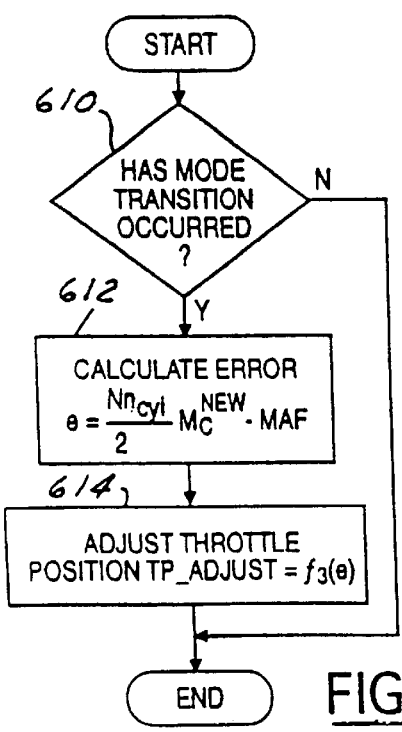

Referring now to FIG. 6, a routine is described where the method according to the present invention is improved upon using feedback from available sensors. In particular, when a mass airflow signal is available, it can be used in conjunction with the present invention to provide additional control and compensation for any calculation errors. First, in step 610, a determination is made as to whether a mode transition has occurred. When the answer to step 610 is YES, the routine continues to step 612. In step 612, an error is calculated between the new desired cylinder air charge multiplied by engine speed and the number of cylinders and the current reading of the mass airflow sensor. Next, in step 614, this error is used to adjust throttle position from the throttle position calculated in step 316. Controller 12 then controls actual throttle position to this adjusted throttle position. In this way, any calculation errors used in determining the throttle position change that corresponds to the variable cam timing position change to give equal engine torque at a mode transition can be compensated. In an alternative embodiment, the cam timing can be adjusted based on the error signal rather than the throttle position. In another alternative embodiment, both the cam timing and the throttle position can be adjusted based the error signal.

Figure 7:
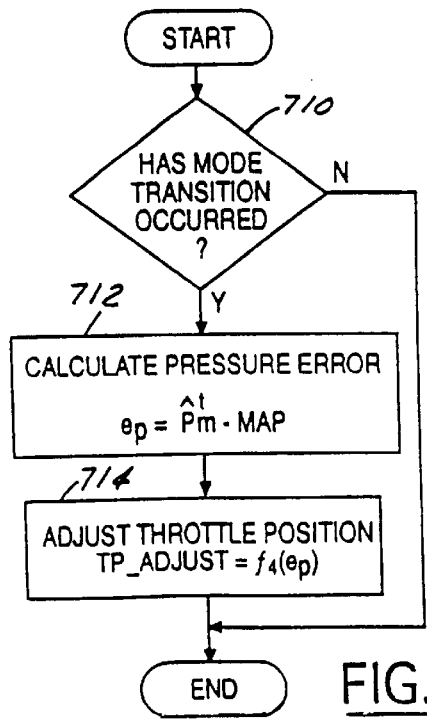

Referring now to FIG. 7, the routine is described where a manifold pressure sensor is used to compensate for any imperfect calculations. First, in step 710, a determination is made as to whether a mode transition has occurred. If the answer to step 710 is YES, the routine continues to step 712 where a manifold pressure error is calculated between the manifold pressure determined in step 310 and the current manifold pressure. Next, in step 712, the throttle position is adjusted based on the manifold pressure error determined in step 712. Controller 12 then controls actual throttle position to this adjusted throttle position. In this way, abrupt changes in engine torque can be avoided during a mode transition despite variations not accounted for in the equations described in the present invention.

While the invention has been shown and described in its preferred embodiments, it will be clear to those skilled in the arts to which it pertains that many changes and modifications may be made thereto without departing from the scope of the invention. For example, any device, herein termed an outlet control device, that affects flow exiting intake manifold 44 and entering cylinder 30 can be used in place of the variable cam timing unit. For example, a swirl control valve, a charge motion control valve, an intake manifold runner control valve, an electronically controlled intake valve can be used according to the present invention to rapidly change cylinder fresh charge in order to control engine torque. Further, any device that affects flow entering intake manifold 44, herein termed an intake control device can be used in place of the throttle. For example, an EGR valve, a purge control valve, an intake air bypass valve can be used in conjunction with the outlet control device so rapidly change cylinder fresh charge in order to control engine torque.

While the invention has been shown and described in its preferred embodiments, it will be clear to those skilled in the arts to which it pertains that many changes and modifications may be made thereto without departing from the scope of the invention.

We claim:

1. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and calculating a change in an operating position of said outlet control device based on an engine operating parameter, in response to said fuel injection; and wherein said engine operating parameter comprises a first manifold pressure before said cylinder air/fuel ratio change, said method further including:

adjusting said operating position of said outlet control device responsive to said calculated change in said operating position so that a manifold pressure after said air/fuel ratio change approaches said first manifold pressure.

2. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and calculating a change in an operating position of said outlet control device based on an engine operating parameter, in response to said fuel injection; and wherein said engine operating parameter comprises a desired cylinder fresh charge to be inducted by said engine after said cylinder air/fuel ratio change, said method further including:

adjusting said operating position of said outlet control device responsive to said calculated change in said operating position so that an actual cylinder fresh charge approaches said desired cylinder fresh charge.

3. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and calculating a change in an operating position of said outlet control device based on an engine operating parameter, in response to said fuel injection; and;

wherein said outlet control device is one of a swirl control valve, and a dual equal variable cam timing system.

4. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and calculating a change in an operating position of said outlet control device based on an engine operating parameter, such engine operating condition changing as a function of said change in said cylinder air/fuel ratio in response to said fuel injection;

adjusting said operating position of said outlet control device responsive to said calculated change in said operating position so that a value of said engine operating parameter approaches a desired value; and wherein said engine operating parameter comprises one of an intake manifold pressure, a mass air flow rate, and a cylinder air charge.

5. A method for controlling an engine having an intake manifold and an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and in response to said fuel injection, calculating a change in a first operating position of said outlet control device based on an engine operating parameter, and, calculating a change in a second operating position of said inlet control device based on said engine operating parameter; and wherein said engine operating parameter comprises a first manifold pressure before said cylinder air/fuel ratio change, said method further including:

adjusting said first and second operating positions of said outlet control device and said inlet control device, respectively, responsive to said calculated changes in said first and second operating positions, respectively, so that an actual manifold pressure approaches said first manifold pressure.

6. The method of claim 4, wherein said inlet control device comprises a throttle communicating with said intake manifold of said engine.

7. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and calculating a change in an operating position of said outlet control device based on an engine operating parameter, in response to said fuel injection; and wherein said outlet control device is one of a swirl control valve, and a dual equal variable cam timing system.

8. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio;

calculating a change in a first operating position of said outlet control device based on an engine operating parameter, in response to said fuel injection;

calculating a change in a second operating position of said inlet control device based on said engine operating parameter, in response to said fuel injection; and adjusting said first and second operating positions of said outlet and inlet control devices, respectively, responsive to said calculated changes in said first and second operating positions, respectively, so that a value of said engine operating parameter approaches a desired value.

9. The method of claim 8 wherein said operating parameter comprises one of an intake manifold pressure, a mass air flow rate, and a cylinder air charge.

10. An article of manufacture comprising:

a computer storage medium having a computer program encoded therein for controlling an engine during a cylinder air/fuel ratio change from a first cylinder air/fuel ratio to a second cylinder air/fuel ratio, the engine having an intake manifold, an inlet control device for controlling flow entering the manifold, and an outlet control device for controlling flow exiting the intake manifold, said computer storage medium comprising:

code for determining a desired cylinder fresh charge based on said first and second cylinder air/fuel ratio;

code for determining an outlet control device setpoint based on said desired cylinder fresh charge;

code for determining a new inlet control device setpoint based on said desired cylinder fresh charge; and, code for changing said first and second operational positions of said outlet control device and said inlet control device, respectively, responsive to said outlet control device setpoint and said inlet control device setpoint, respectively.

11. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and calculating a change in an operating position of said outlet control device based on an engine operating parameter, such engine operating condition changing as a function of said change in said cylinder air/fuel ratio in response to said fuel injection;

adjusting said operating position of said outlet control device responsive to said calculated change in said operating position so that a value of said engine operating parameter approaches a desired value; and wherein said engine operating parameter comprises intake manifold pressure.

12. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and calculating a change in an operating position of said outlet control device based on an engine operating parameter, such engine operating condition changing as a function of said change in said cylinder air/fuel ratio in response to said fuel injection;

adjusting said operating position of said outlet control device responsive to said calculated change in said operating position so that a value of said engine operating parameter approaches a desired value; and wherein said engine operating parameter comprises mass air flow rate.

13. A method for controlling an engine having an intake manifold, an inlet control device for controlling flow entering the manifold, and an outlet control device for controlling flow from the intake manifold into a cylinder, the method comprising:

directly injecting fuel into said cylinder to change said cylinder air/fuel ratio from a first cylinder air/fuel ratio to a second cylinder air/fuel ratio; and calculating a change in an operating position of said outlet control device based on an engine operating parameter, such engine operating condition changing as a function of said change in said cylinder air/fuel ratio in response to said fuel injection;

adjusting said operating position of said outlet control device responsive to said calculated change in said operating position so that a value of said engine operating parameter approaches a desired value; and wherein said engine operating parameter comprises cylinder air charge.

* * * * *